US011978962B2

(12) United States Patent
Zólomy et al.

(10) Patent No.: US 11,978,962 B2
(45) Date of Patent: May 7, 2024

(54) ROTATIONAL SYMMETRIC AoX ANTENNA ARRAY WITH METAMATERIAL ANTENNAS

(71) Applicant: Silicon Laboratories Inc., Austin, TX (US)

(72) Inventors: Attila Zólomy, Budapest (HU); Ádám Süle, Budapest (HU); Joel Kauppo, Helsinki (FI); Terry Lee Dickey, Pflugerville, TX (US); Jeffrey Tindle, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 102 days.

(21) Appl. No.: 17/846,594

(22) Filed: Jun. 22, 2022

(65) Prior Publication Data

US 2023/0420869 A1 Dec. 28, 2023

(51) Int. Cl.
*H01Q 21/20* (2006.01)
*H01Q 1/48* (2006.01)
(Continued)

(52) U.S. Cl.
CPC ............... *H01Q 21/20* (2013.01); *H01Q 1/48* (2013.01); *H01Q 1/50* (2013.01); *H01Q 1/523* (2013.01); *H01Q 9/0407* (2013.01)

(58) Field of Classification Search
CPC .......... H01Q 1/50; H01Q 21/065; H01Q 1/00; H01Q 21/20; H01Q 1/48; H01Q 1/523; H01Q 9/0407
See application file for complete search history.

(56) References Cited

U.S. PATENT DOCUMENTS 7,463,213 B2 12/2008 Nakano et al.
8,395,552 B2 3/2013 Geiler et al.
(Continued)

FOREIGN PATENT DOCUMENTS

EP 1425817 B1 7/2009

OTHER PUBLICATIONS

Notice of Allowance dated Jan. 10, 2023 in co-pending U.S. Appl. No. 17/356,853.
(Continued)

*Primary Examiner* — Vibol Tan
(74) *Attorney, Agent, or Firm* — NIELDS, LEMACK & FRAME, LLC

(57) ABSTRACT

An antenna array that utilizes ground guard rings and metamaterial structures is disclosed. In certain embodiments, the antenna array is constructed from a plurality of antenna unit cells, wherein each antenna unit cell is identical. The antenna unit cell comprises a top surface, that contains a patch antenna and a ground guard ring. A reactive impedance surface (RIS) layer is disposed beneath the top surface and contains the metamaterial structures. The metamaterial structures are configured to present an inductance to the patch antennas, thereby allowing the patch antennas to be smaller than would otherwise be possible. In some embodiments, the metamaterial structures comprise hollow square frames. An antenna array constructed using this antenna unit cell has less coupling than conventional antenna arrays, which results in better performance. Furthermore, this new antenna array also requires less space than conventional antenna arrays.

25 Claims, 16 Drawing Sheets

(51) Int. Cl.
*H01Q 1/50* (2006.01)
*H01Q 1/52* (2006.01)
*H01Q 9/04* (2006.01)

(56) References Cited

U.S. PATENT DOCUMENTS

| | | | | |
|---|---|---|---|---|
| 8,836,608 | B2 | 9/2014 | Dandekar et al. | |
| 9,537,221 | B2 | 1/2017 | Maruyama et al. | |
| 9,831,557 | B2 * | 11/2017 | Park | H01Q 9/0428 |
| 11,133,601 | B2 * | 9/2021 | Yoon | H01Q 21/065 |
| 11,611,152 | B2 * | 3/2023 | Zólomy | H01Q 21/065 |
| 2010/0277374 | A1 | 11/2010 | Ju et al. | |
| 2018/0191073 | A1 | 7/2018 | Celik | |
| 2019/0036226 | A1 | 1/2019 | Ding et al. | |
| 2022/0416436 | A1 | 12/2022 | Zólomy et al. | |
| 2022/0416439 | A1 | 12/2022 | Zólomy et al. | |

OTHER PUBLICATIONS

Krzysztofik et al., "Metamaterials in Application to Improve Antenna Parameters", Metamaterials and Metasurfaces, Chapter 4, pp. 63-85, Jan. 2019.

Mosallaei et al., "Antenna Miniaturization and Bandwidth Enhancement Using a Reactive Impedance Substrate", IEEE Transactions on Antennas and Propagation, vol. 52, No. 9, pp. 2403-2414, Sep. 2004.

Nasimuddin et al., "Metasurface-based Low Profile Broadband Circularly Polarized Antenna", Proc. of the 2017 IEEE Region 10 Conference (TENCON), Malaysia, Nov. 5-8, 2017, pp. 2378-2382.

Office action dated Sep. 7, 2022 in co-pending U.S. Appl. No. 17/356,853.

Office Action mailed Feb. 28, 2024 in co-pending U.S. Appl. No. 17/830,536.

* cited by examiner

ROTATIONAL SYMMETRIC AoX ANTENNA ARRAY WITH METAMATERIAL ANTENNAS

This disclosure describes a rotational antenna array, and more particularly to a rotational antenna array that utilizes a reactive impedance surface to achieve symmetric performance.

BACKGROUND

The explosion of network connected devices has led to an increased use of certain wireless protocols. For example, simple wireless network devices are being implemented as temperature sensors, humidity sensors, pressure sensors, motion sensors, cameras, light sensors, dimmers, light sources, and other functions. Additionally, these wireless network devices have become smaller and smaller.

These wireless network devices are typically equipped with an embedded antenna. In certain embodiments, an antenna array may be required. For example, for Angle of Arrival and Angle of Departure calculations, an antenna array is necessary. In certain embodiments, the array may be a two dimensional array, such as an N×M array, where N and M are both greater than one. In other embodiments, the array may be a one dimensional array, such as N×1 or 1×M, where N and M are greater than one. However, these two dimensional arrays are not symmetric. In other words, the antennas that are on the interior of the array are surrounded by four other antennas, while those arranged at the perimeter of the array are surrounded by fewer other antennas. This difference affects the phase performance of the antennas, such that different antennas exhibit different phase characteristics based on their position in the array.

While this phase difference may be compensated by software, there is a lengthy calibration process that must be performed. Further, the compensation coefficients for each antenna must be calculated and stored. Since each antenna has a horizontal port and a vertical port, and each port receives a θ and φ polarized signal, there are four compensation coefficients for each antenna. For a 4×4 array, this means that 64 compensation values must be calculated and stored.

Therefore, it would be advantageous if there were an antenna array that had a small form factor, and additionally exhibited symmetric phase performance for all of the antenna elements.

SUMMARY

An antenna array that utilizes antenna arranged in a rotational symmetric configuration is disclosed. The outer ring of the array comprises a plurality of identical antenna unit cells. The antenna unit cell comprises a top surface, that contains a patch antenna and an optional ground guard ring. A reactive impedance surface (RIS) layer is disposed beneath the top surface and contains the metamaterial structures. The metamaterial structures are configured to present an inductance to the patch antennas, thereby allowing the patch antennas to be smaller than would otherwise be possible. In some embodiments, the metamaterial structures comprise hollow square frames. A central antenna is disposed inside the rotational symmetric configuration to provide an indication of gain. This central antenna is configured such that each of the antenna unit cells in the outer ring sees the same impedance from the central antenna.

According to one embodiment, an antenna array is disclosed. The antenna array comprises a plurality ($N_a$) of antenna unit cells arranged in an outer ring, each antenna unit cell offset from an adjacent antenna unit cell by an angle equal to 360°/$N_a$, wherein each antenna unit cell comprises a top surface, comprising a patch antenna and a ground guard ring surrounding the patch antenna; a reactive impedance surface (RIS) layer disposed beneath the top surface, wherein the RIS layer comprises metamaterial structures; and a ground layer disposed beneath the RIS layer, wherein stitching vias electrically connect the ground guard ring to the ground layer; and a central antenna disposed inside the outer ring. In some embodiments, the RIS layer is immediately adjacent to the top surface. In some embodiments, the ground layer is immediately adjacent to the RIS layer. In some embodiments, the metamaterial structures comprise hollow square frames. In some embodiments, an integral number of metamaterial structures are disposed on the RIS layer in an area defined by the ground guard ring. In certain embodiments, the integral number is $N^2$, wherein N is an integer. In some embodiments, one or more unused metal layers are disposed between the top surface and the RIS layer and/or between the RIS layer and the ground layer.

According to another embodiment, an antenna array is disclosed. The antenna array comprises a plurality ($N_a$) of antenna unit cells arranged in an outer ring, each antenna unit cell offset from an adjacent antenna unit cell by an angle equal to 360°/$N_a$, wherein each antenna unit cell comprises a top surface, comprising a patch antenna and a ground guard ring surrounding the patch antenna; a reactive impedance surface (RIS) layer disposed beneath the top surface, wherein the RIS layer comprises metamaterial structures; and a ground layer disposed beneath the RIS layer, wherein stitching vias electrically connect the ground guard ring to the ground layer; a central antenna disposed inside the outer ring; and a ground plane disposed on the top surface, disposed on the top surface between the central antenna and the outer ring and outside the outer ring. In some embodiments, an outer perimeter of the ground plane is circular. In some embodiments, an outer perimeter of the ground plane is a polygon having $N_a$ sides. In certain embodiments, sides of the outer perimeter of the ground plane are parallel to edges of the antenna unit cells disposed in the outer ring. In certain embodiments, sides of the outer perimeter of the ground plane are offset from edges of the antenna unit cells disposed in the outer ring by 180°/$N_a$. In some embodiments, an inner perimeter of the ground plane is circular. In some embodiments, an inner perimeter of the ground plane is a polygon having $N_a$ sides. In certain embodiments, sides of the inner perimeter of the ground plane are parallel to edges of the antenna unit cells disposed in the outer ring. In certain embodiments, sides of the inner perimeter of the ground plane are offset from edges of the antenna unit cells disposed in the outer ring by 180°/$N_a$. In some embodiments, the ground guard ring of each antenna unit cell contacts the ground guard ring of two adjacent antenna unit cells. In some embodiments, each patch antenna comprises star-shaped slots in a center of the patch antenna and one or more slots extending inward from a perimeter of the patch antenna. In some embodiments, the central antenna comprises a central patch antenna, and the central patch antenna is circular. In some embodiments, the central antenna comprises a central patch antenna, and the central patch antenna is a polygon having $N_a$ sides. In some embodiments, the central antenna comprises a central patch antenna having star-shaped slots in a center of the central patch antenna and one or more slots extending inward from a perimeter of the central patch antenna.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1A:
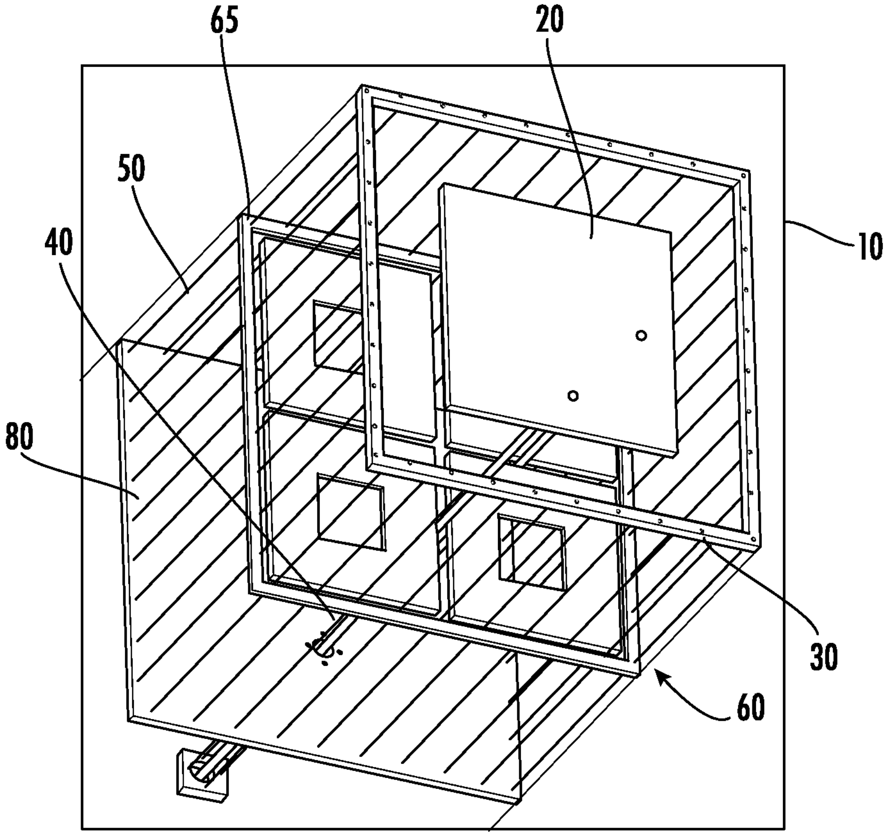
FIG. 1A shows an exploded view of the structure of one antenna unit cell in the rotational symmetric antenna array according to one embodiment.

FIG. 1A shows an exploded view of one antenna unit cell 10 that may be part of a rotational symmetric antenna array according to one embodiment.

Figure 2A:
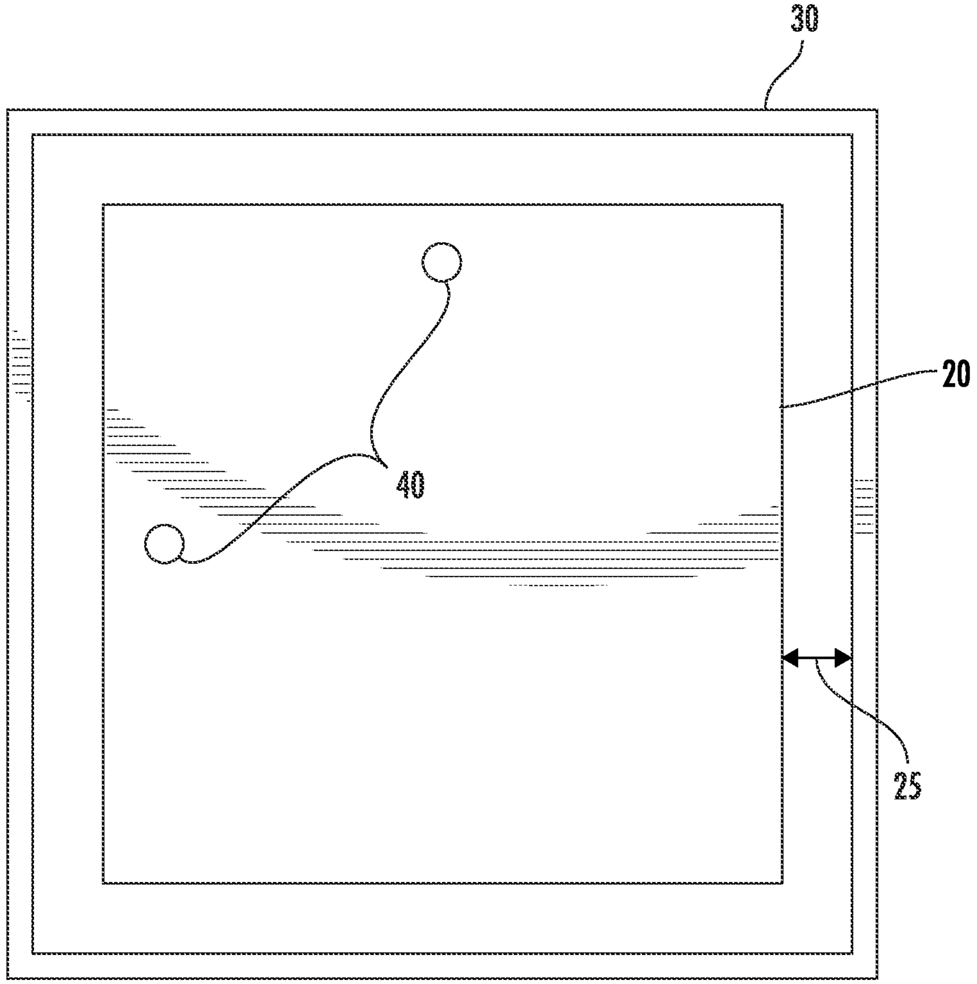
FIG. 2A shows a top view of the patch antenna and ground guard ring for the antenna unit cell shown in FIG. 1A.
Figure 3:
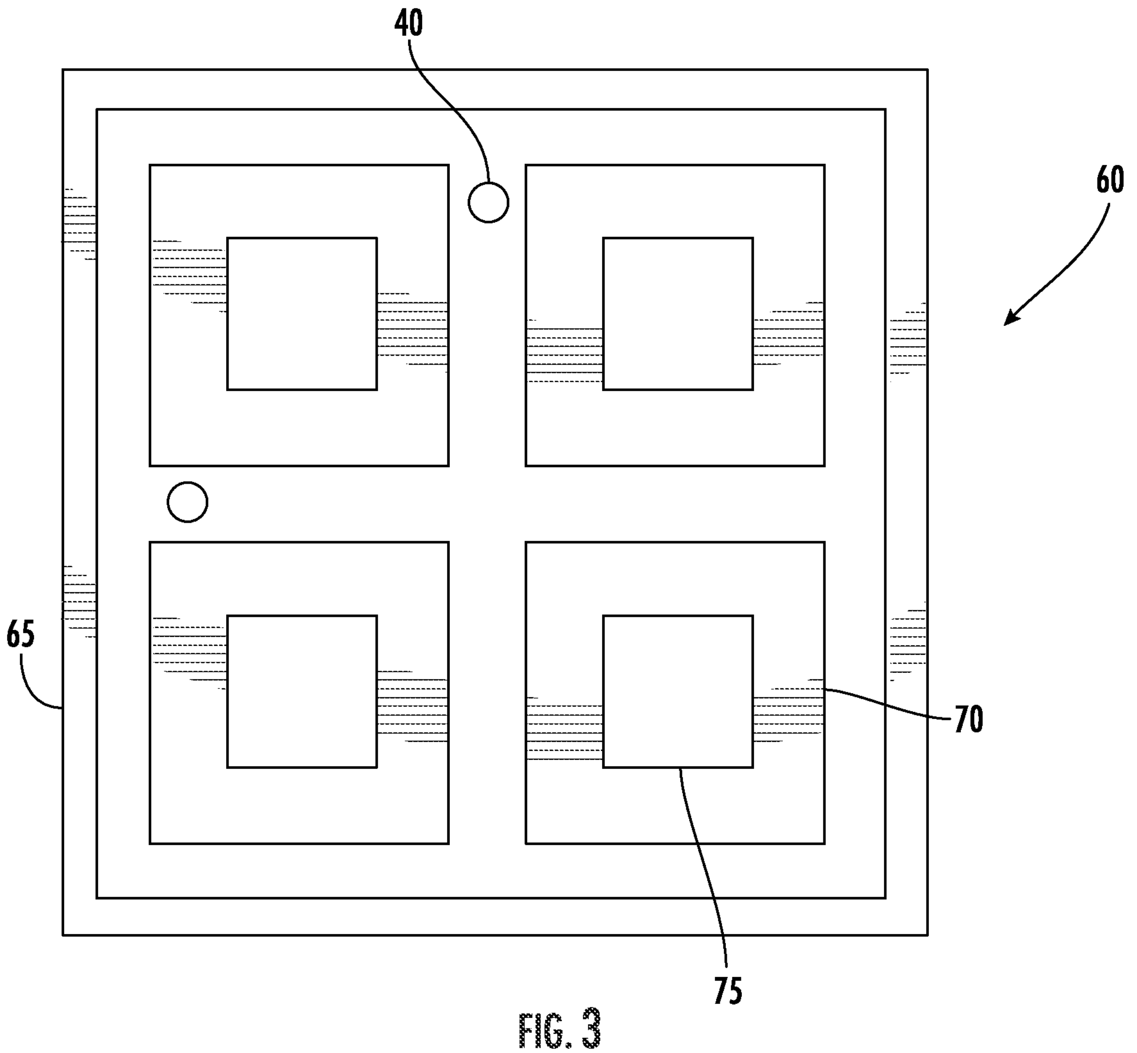
FIG. 3 shows a top view of the RIS layer and metamaterial structures.

As shown in FIG. 1A, the structure of the antenna unit cell 10 utilizes three layers of a conventional printed circuit board. Other layers of the printed circuit board may be used to provide power planes, additional ground layers and signal layers. FIG. 2A is a top view of the top surface of the printed circuit board corresponding to the antenna unit cell in FIG. 1A. FIG. 3 is a top view of the RIS layer 60.

The top surface of the printed circuit board is used for the patch antenna 20, while a lower layer is used for the ground layer 80. A reactive impedance surface (RIS) layer 60 is disposed beneath the top surface and above the ground layer 80. In certain embodiments, the RIS layer 60 is the layer immediately adjacent to the top surface. In some embodiments, the ground layer 80 is the layer immediately below the RIS layer 60, such that the top layer, the RIS layer 60 and the ground layer 80 are adjacent.

In other embodiments, there may be one or more intermediate layers between the RIS layer 60 and the ground layer 80, if thicker dielectric is required between them. In certain embodiments, no metal is disposed on these intermediate layers, except for another instantiation of the top guard ring.

As stated above, in certain embodiments, a patch antenna 20 is disposed on the top layer of the printed circuit board. The patch antenna 20 may be square such that the patch antenna 20 may be used to receive and transmit both radially and tangentially polarized signals. The size of the patch antenna 20 is typically defined by the desired resonant frequency, the thickness of the printed circuit board and the dielectric constant of the printed circuit board. In RIS antenna cell structures, additional tuning knobs may include the dielectric thickness between the patch antenna 20 and the RIS layer 60 and between the RIS layer 60 and the ground layer 80. Also, additional tuning knobs are the metamaterial structure frame size and width on the RIS layer 60.

The patch antenna 20 may be made of copper or another conductive material. The process of creating a plated area on a surface of a printed circuit board is well known.

As best seen in FIG. 2A, in certain embodiments, the patch antenna 20 comprises two signal vias 40 which are used to electrically connect the patch antenna 20 to a signal layer or multiple signal layers. All signal layers are situated beneath the ground layer 80. In certain embodiments, the signal vias 40 pass through the ground layer 80 to a signal layer that is disposed beneath the ground layer 80. In certain embodiments, each signal via 40 may be disposed at or near the midpoint of the patch antenna 20 in one direction near an edge of the patch antenna 20. In this way, the patch antenna 20 may be used to transmit and receive radially and tangentially polarized signals. In embodiments where only one polarization is required, only one signal via 40 may be used. In other embodiments, the one signal via 40 may be situated at the diagonal of the patch to generate circular polarized signal.

In some embodiments, a ground guard ring 30 may be disposed around the perimeter of the patch antenna 20. In certain embodiments, the ground guard ring 30 may be a hollow square frame, having a thickness of at least the half of the total thickness between the top layer and the ground layer 80. In certain embodiments, the guard rings may be sufficiently wide so as to incorporate the stitching vias 50. The inner dimension of the ground guard ring is larger than the outer dimension of the patch antenna 20, such that there may be a gap 25 separating the patch antenna 20 from the ground guard ring 30 on all sides. In certain embodiments, the gap 25 may be approximately three times the total thickness between the top layer and the ground layer 80 or higher.

As can be seen in FIG. 1A, the ground guard ring 30 is electrically connected to the ground layer 80 using a plurality of stitching vias 50, which are electrically conductive. These stitching vias 50 extend from the top surface to the ground layer 80. In certain embodiments, the distance between adjacent stitching vias 50 may be less than $\lambda/8$, where $\lambda$ is the wavelength of interest. A typical diameter of the stitching vias 50 may be about 0.24 mm. Therefore, in some embodiments, the ground guard ring 30 is wider than this diameter.

Beneath the top surface is the RIS layer 60, which is also shown in FIG. 3. The RIS layer 60 comprises a plurality of periodic metamaterial structures 70, shaped so as to realize a reactive impedance for incident electromagnetic waves. Metamaterial is the term given to any material engineered (typically by varying its shape) to provide electromagnetic properties that are not found in the base material. These metamaterial structures 70 may be many different shapes, including a Hilbert fractal inclusion of a second-, third-, or fourth-order, a rectangular spiral, a square spiral, a rectangular ring, or a split ring resonator.

In one particular embodiment, the metamaterial structure 70 may be a hollow square frame, having an outer dimension and an inner dimension that defines a hollow interior portion 75. The width of the frame, defined as one half of the difference between the outer dimension and the inner dimension, may be adjusted to tune the resonant frequency of the metamaterial structure 70. Again, the dimensions of the metamaterial structure 70 may depend on the resonant frequency, the dielectric constant of the printed circuit board, the thickness of the dielectric between the RIS layer 60 and ground layer 80, the thickness of the applied metal, the spacing between the consecutive metamaterial structures and width of the frame of the metamaterial structures 70.

In certain embodiments, the metamaterial structures 70 are sized such that an integral number of these structures may be arranged in the area defined by the ground guard ring 30 on the top surface of the printed circuit board. In certain embodiments, this integral number may be $N^2$, where N is an integer. In other embodiments, this integral number may be N×M, where N and M are integers. In FIG. 1A, it can be seen that four metamaterial structures 70 are disposed in the area defined by the ground guard ring 30 on the top surface. However, the disclosure is not limited to this embodiment. Further, as shown in FIG. 1A, the stitching vias 50 that connect the ground guard ring 30 to the ground layer 80 may be seen around the perimeter of the metamaterial structures. Additionally, the signal vias 40 are also shown. Note that if N is even, the signal vias 40 may pass between two adjacent metamaterial structures 70.

In some embodiments, there is a RIS ground guard ring 65 surrounding the metamaterial structures 70 on the RIS layer 60 to further improve the isolation. This RIS ground guard ring 65 may have the same dimensions as the ground guard ring 30 on the top surface and may be vertically aligned with that ring. Note that in this embodiment, the stitching vias 50 connect the ground guard ring 30 to the RIS ground guard ring 65 and to the ground layer 80. In this embodiment, the gap between the metamaterial structures 70 and the RIS ground guard ring 65 should be at least the dielectric thickness between the RIS layer 60 and the ground layer 80 to avoid any effect on the RIS resonant frequency. If the gap is smaller, then it shifts the RIS resonant frequency down, but also degrades the radiation efficiency.

Figure 4:
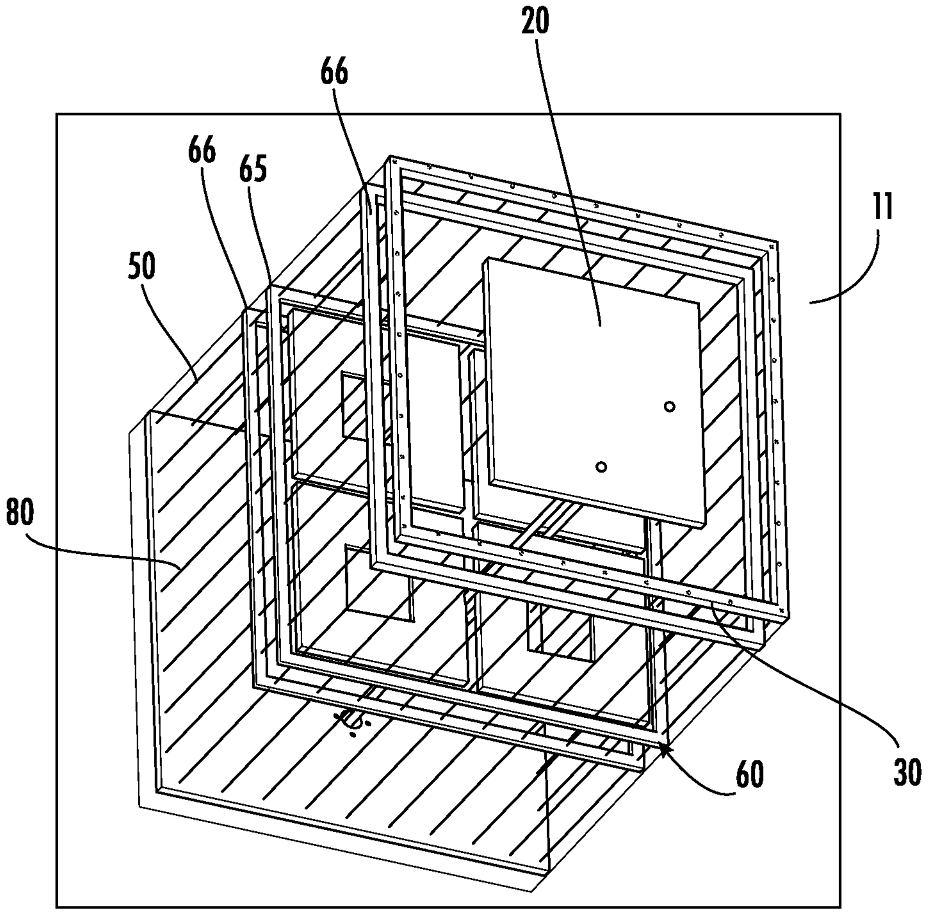
FIG. 4 shows an exploded view of variation of the antenna unit cell of FIG. 1A.

While the above disclosure describes a configuration that utilizes three layers of a printed circuit board, other embodiments are also possible. For example, as shown in FIG. 4, a 6 layer PCB may be used to allow more flexibility in the design and some of the metal layers left unused beneath the antennas for better radiation. Of course, more layers may be used. Thus, practically, some of the dielectric layers are unified by this way to form a thicker dielectric layer. Optionally, auxiliary ground guard rings 66 can be applied in these unused metal layers as well. That is advantageous for two reasons. First, these auxiliary ground guard rings 66 further improve the isolation between antenna unit cells 11. Second, these additional auxiliary ground guard rings 66 make the PCB manufacturing more balanced from PCB tension point of view: as leaving metal layers fully unused may cause metal unbalance and thus, unwanted mechanical tensions in the PCB. In FIG. 4, the unused metal layers are disposed on opposite sides of the RIS layer 60. However, the unused layers may be disposed in other locations. For example, the unused metal layers may only be disposed between the top surface and the RIS layer 60 or only between the RIS layer 60 and the ground layer 80.

Figure 1B:
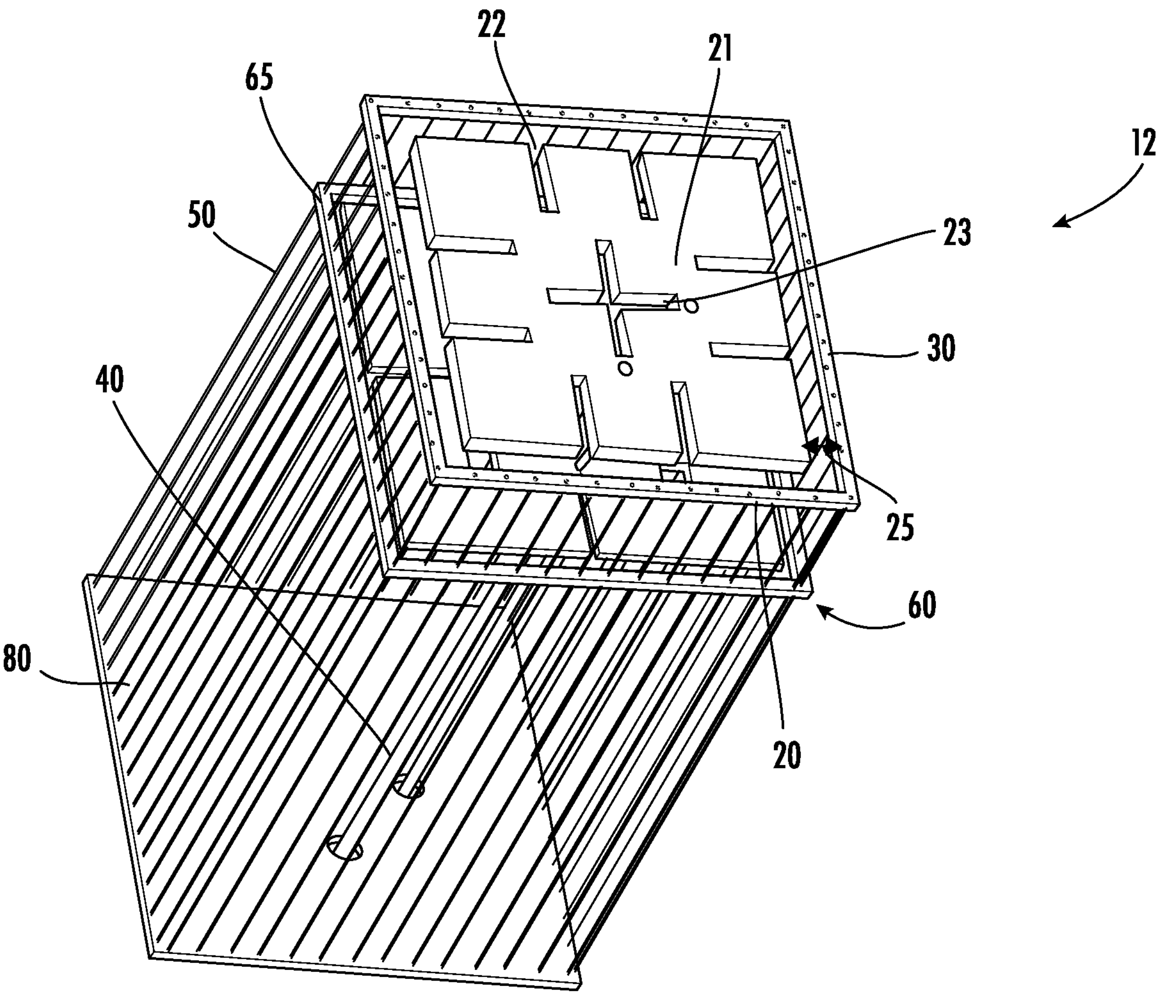
FIG. 1B shows an exploded view of the structure of one antenna unit cell in the rotational symmetric antenna array according to a second embodiment.

FIG. 1B shows an exploded view of one slotted antenna unit cell 12 that may be part of a rotational symmetric antenna array according to a second embodiment.

Figure 2B:
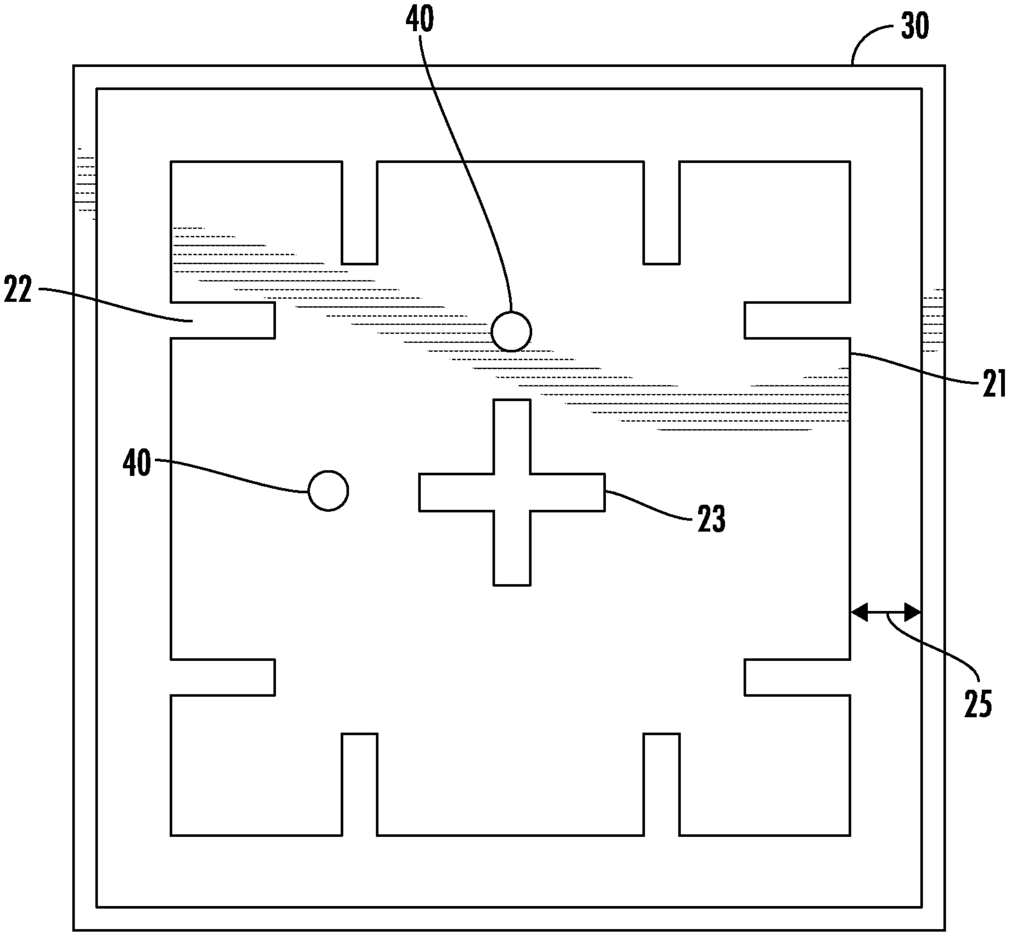
FIG. 2B shows a top view of the patch antenna and ground guard ring for the antenna unit cell shown in FIG. 1B.

Like the embodiment of FIG. 1A, the structure of the slotted antenna unit cell 12 utilizes three layers of a conventional printed circuit board. Other layers of the printed circuit board may be used to provide power planes, additional ground layers and signal layers. FIG. 2B is a top view of the top surface of the printed circuit board corresponding to the slotted antenna unit cell 12 in FIG. 1B. FIG. 3 is a top view of the RIS layer 60. Like components have been given identical reference designators and will not be described again.

In FIG. 1B, the patch antenna 21 is a square having a plurality of slots. In certain embodiments, there may be a star-shaped slots 23 in the center of the patch antenna 21. Additionally, there may be one or more slots 22 extending inward from the perimeter of the square. In FIG. 1B, there are two slots 22 extending inward from each side of the square. However, there may be more or fewer slots 22 on each side of the square.

Optionally, a ground guard ring 30 may be disposed around the perimeter of the patch antenna 21, as described above with respect to FIG. 1A. In other embodiments, the ground guard ring 30 is not utilized.

As best seen in FIG. 2B, in certain embodiments, the patch antenna 21 comprises two signal vias 40 which are used to electrically connect the patch antenna 21 to a signal layer or multiple signal layers. All signal layers are situated beneath the ground layer 80. In certain embodiments, the signal vias 40 pass through the ground layer 80 to a signal layer that is disposed beneath the ground layer 80. In certain embodiments, each signal via 40 may be disposed at or near the midpoint of the patch antenna 20 in one direction and near the star-shaped slots 23 in the second direction. In this way, the patch antenna 21 may be used to transmit and receive horizontally and vertically polarized signals. In embodiments where only one polarization is required, only one signal via 40 may be used.

Although not shown, the patch antenna 21 may be used with the six layer PCB shown in FIG. 4.

Thus, the present disclosure describes an antenna unit cell that utilizes three layers of a printed circuit board. The top layer comprises a patch antenna and an optional ground guard ring 30 that surrounds the patch antenna. Beneath the top layer comprises a RIS layer 60 that comprises an integral number of metamaterial structures 70 that fit within the area defined by the ground guard ring 30 on the top layer. In some embodiments, the RIS layer 60 also includes a RIS ground guard ring 65. Below the RIS layer 60 is the ground layer.

Importantly, the RIS layer 60 has the effect of presenting a larger inductance. Therefore, a smaller patch antenna, having lower capacitance, can achieve the same resonant frequency as a larger patch antenna that does not utilize the RIS layer 60. Further, the use of slots, as shown in FIG. 1B may further reduce the size of the patch antenna.

In one particular embodiment, the antenna array may be designed to transmit and receive radio frequency signals having a nominal frequency of about 2.45 GHz. This is the frequency used for many wireless protocols, including Bluetooth, WiFi, Zigbee, Thread and other 802.15.4 protocols.

In these embodiments, the patch antenna 20 may have an outer dimension of 22×22 mm. Further, in these embodiments, the inner dimension of the metamaterial structure 70 may be 2×2 mm, while the outer dimension may be 12×12 mm. This dimension may vary based on the distance between adjacent metamaterial structures and also on the cumulative dielectric thickness between the RIS layer 60 and the ground layer 80.

In some embodiments, the antenna array may be used in conjunction with an Angle of Arrival or Angle of Departure (collective, AoX) algorithm to determine a location of another wireless device. Various algorithms exist to determine the AoX of another device. For example, the MUSIC algorithm creates a one or two dimensional graph, depending on the configuration of the antenna array, where each peak on the graph represents a direction of arrival for an incoming signal. This one or two dimensional graph may be referred to as a pseudo-spectrum. The MUSIC algorithm calculates a value for each point on the graph.

In addition to the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the angle of arrival.

To perform Angle of Arrival or Angle of Departure calculations, an antenna array is needed. Thus, the antenna unit cell shown in FIG. 1A or FIG. 1B may be used as part of an antenna array.

Figure 5:
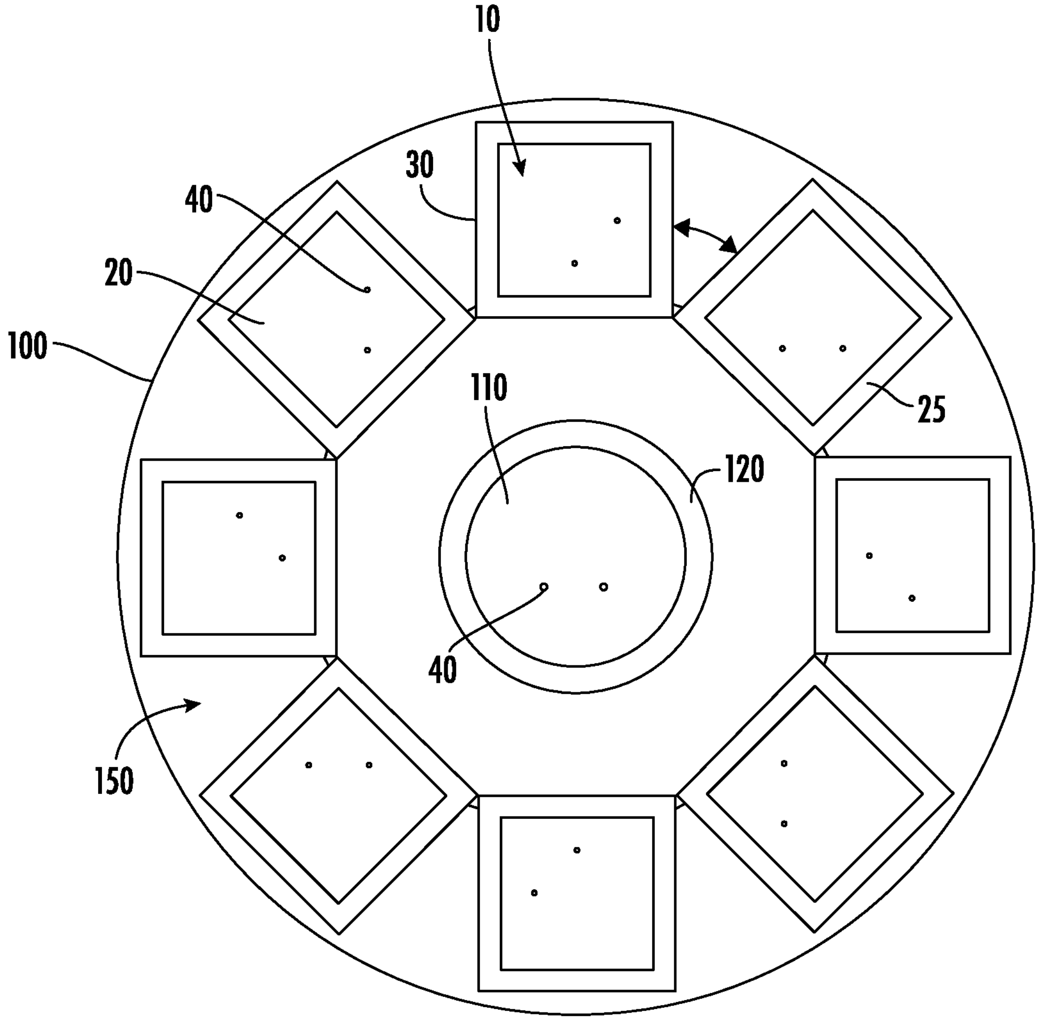
FIG. 5 shows a rotational symmetric antenna array having eight antenna unit cells according to one embodiment.

FIG. 5 shows a first embodiment of a rotational symmetric antenna array utilizing the antenna unit cell 10 of FIG. 1A. In this embodiment, there are eight antenna unit cells 10 arranged in an outer ring 150, which, in this figure, is an octagon. This is accomplished by offsetting each antenna unit cell 10 from the adjacent antenna unit cell by an angle, $\alpha$, wherein $\alpha$ is defined as 360° divided by the number of antenna unit cells used in the outer ring 150. Thus, in this embodiment, $\alpha$ is 45°. Further, the rotational symmetric antenna array also includes a central antenna 110 which is located inside the outer ring 150. In this embodiment, the central antenna 110 includes a central patch antenna having a circular shape. Importantly, the circular shape of the central patch antenna of the central antenna 110 means that each of the antenna unit cells 10 in the outer ring 150 has the same spatial relationship to the central antenna 110.

In certain embodiments, the central antenna 110 may be configured to use a RIS layer 60, similar to that shown in FIGS. 1A and 1B. In other embodiments, the central antenna 110 may not utilize metamaterials. For example, the central antenna 110 may comprise only a central patch antenna with signal vias 40 connecting it to signal traces. In some embodiments, the central patch antenna may be on the top surface, as are the antenna unit cells 10 in the outer ring 150. In another embodiment, the central patch antenna may be disposed on a layer of the PCB that is below the top surface. For example, the central patch antenna may be disposed on an intermediate layer. In this scenario, the central patch antenna is fully surrounded by the laminate dielectric, which makes further size reduction possible. However, to achieve good radiation efficiency, the dielectric thickness between the central patch antenna and the ground layer 80 may need to be maximized. Therefore, it may be advantageous to bury the central antenna 110 in the first intermediate layer just beneath the top layer.

In certain embodiments, the antenna unit cells 10 are arranged such that the corner of the ground guard ring 30 of one antenna unit cell 10 touches the corner of the ground guard ring 30 of the adjacent antenna unit cell 10 at one point. In other embodiments, the ground guard rings 30 of adjacent antenna unit cells 10 may be separated from each other.

Further, in some embodiments, a ground plane 100 is disposed on the top surface between the central antenna 110 and the outer ring 150 and outside the outer ring 150. The ground guard rings 30 contact the ground plane 100 around the perimeter of each antenna unit cell. Further, as noted above, each ground guard ring 30 contacts each of the ground guard ring 30 of the two adjacent antenna unit cells 10 at a point.

In certain embodiments, it may be possible to eliminate the ground guard ring 30. In this embodiment, the gap 25 (which was previously defined as the gap between the patch antenna 20 and the ground guard ring 30), exists between the patch antenna 20 and the ground plane 100. The corner of this gap 25 of one antenna unit cell 10 touches the corner of the gap 25 of an adjacent antenna unit cell 10. The unit antenna cells 10 are arranged such that the width of the gap 25 is not affected by the contact between adjacent unit cells. In these embodiments, stitching vias 50 are used to connect the ground plane 100 to the ground layer 80. As noted above, the distance between adjacent stitching vias 50 may be less than $\lambda/8$, where $\lambda$ is the wavelength of interest.

In one embodiment, shown in FIG. 5, the outer perimeter of the ground plane 100 may be circular. The outer perimeter is defined as the outer edge of the ground plane 100 which is outside the outer ring 150. Further, the inner perimeter of the ground plane 100 may also be circular. The inner perimeter is defined as the inner edge of the ground plane 100 which is disposed between the inside of the outer ring 150 and the central antenna 110. A gap 120 may exist between the patch antenna of the central antenna 110 and the ground plane 100. This gap 120 may be uniform around the circumference of the central antenna 110 and its width is typically 3 times the cumulative thickness of the layers between the patch antenna 10 and the ground layer beneath.

Figure 6:
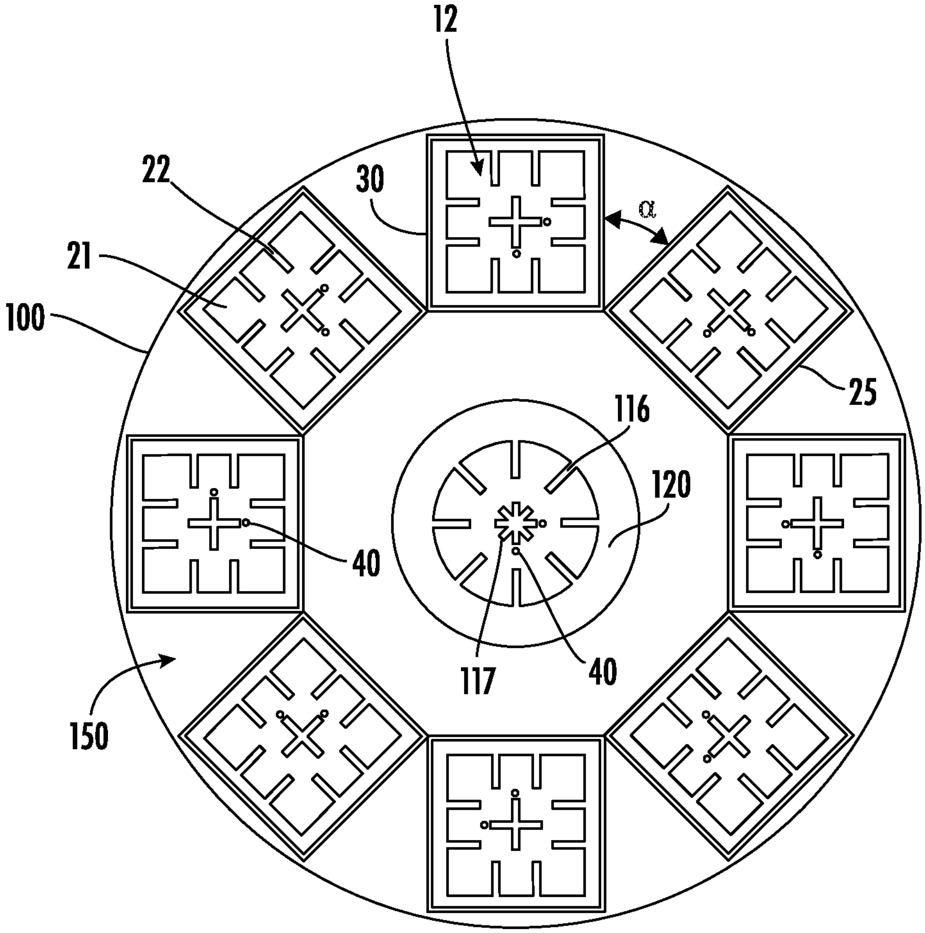
FIG. 6 shows a rotational symmetric antenna array having eight antenna unit cells according to a second embodiment.

FIG. 6 shows an embodiment similar to FIG. 5, that utilizes the slotted antenna unit cells 12 from FIG. 1B. The slots 22 in the patch antenna 21 of the slotted antenna unit cells 12 may help reduce the size of each slotted antenna unit cell 12, making the rotational symmetric antenna array more compact. In addition, optionally, the slotted central antenna 115 may include a central patch antenna having slots 116 as well. In some embodiments, the number of slots 116 that extend inward from the outer perimeter may be equal to the number of slotted antenna unit cells 12 in the outer ring 150. In other embodiments, the number of slots 116 may be an integral multiple of the number of slotted antenna unit cells 12 in the outer ring. Additionally, the central patch antenna for the slotted central antenna 115 may have star-shaped slots 117 at its center. Again, the number of slots in the star shape may be equal to the number of slotted antenna unit cells 12 in the outer ring. As described above, the central patch antenna for the slotted central antenna 115 may be disposed on the top surface or an intermediate layer. Further, the slotted central antenna 115 may or may not utilize metamaterials, as described above.

It is noted that the slotted central antenna 115 may be utilized with the antenna unit cells 10 shown in FIG. 5 if desired. Conversely, the central antenna 110 of FIG. 5 may be utilized with the slotted antenna unit cells 12 of FIG. 6. In other words, it is possible to have embodiment where only one of the central antenna or the antenna unit cells in the outer ring 150 have slots.

Figure 7:
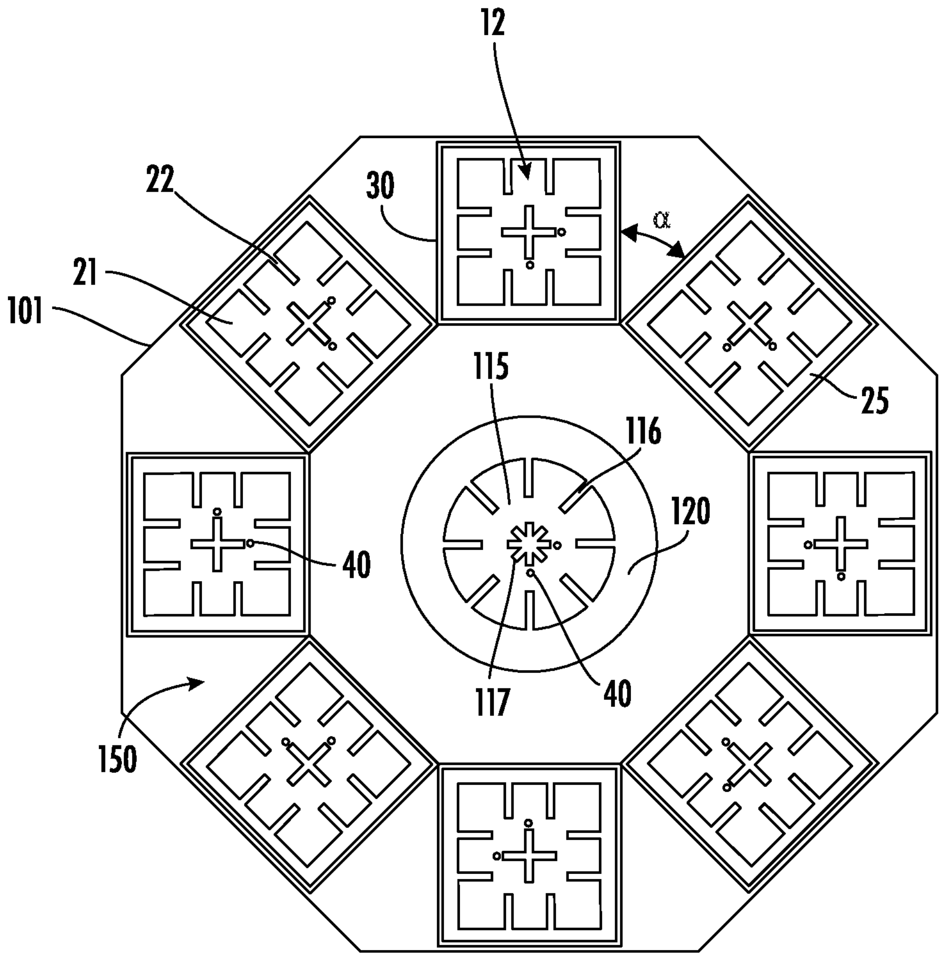
FIG. 7 shows a rotational symmetric antenna array having eight antenna unit cells according to a third embodiment.

FIG. 7 shows another variation of the rotational symmetric antenna array. This figure is similar to that shown in FIG.

6, except the shape of the ground plane 101 has been modified. The outer perimeter of the ground plane 101, instead of being circular as in FIG. 6, is now a polygon having the same number of sides as there are slotted antenna unit cells 12 in the outer ring 150. Thus, in this figure, the outer perimeter of the ground plane 101 forms an octagon. Further, the sides of the outer perimeter of the ground plane 101 are parallel with the outer edges of each of the slotted antenna unit cells 12 in the outer ring 150.

It is noted that the ground plane 101 shown in FIG. 7 may be utilized with the antenna unit cells 10 of FIG. 5 if desired.

Figure 8:
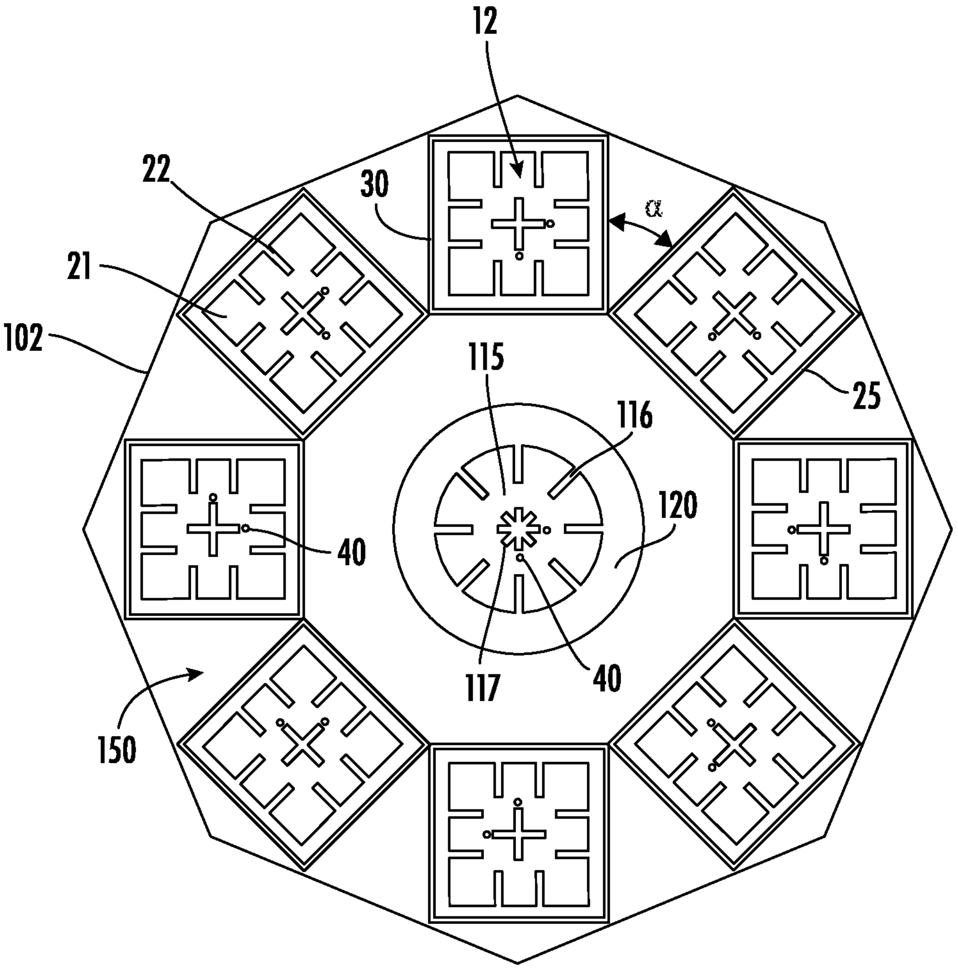
FIG. 8 shows a rotational symmetric antenna array having eight antenna unit cells according to a fourth embodiment.

FIG. 8 shows a variation of the rotational symmetric antenna array shown in FIG. 7. Like FIG. 7, the outer perimeter of the ground plane 102 is a polygon having the same number of sides as there are slotted antenna unit cells 12 in the outer ring. However, in this embodiment, the sides of outer perimeter of the ground plane 102 are not parallel to the outer edges of each of the slotted antenna unit cells 12 in the outer ring 150. Rather, the corners of the sides of the outer perimeter of the ground plane 102 are located along a line that extends from the center of the rotational symmetric antenna array and passes through the midpoint of the side of a slotted antenna unit cell 12. In other words, the ground plane 102 is rotated by 180°/$N_a$, wherein $N_a$ is the number of slotted antenna unit cells 12. Thus, the outer perimeter is offset by 180°/$N_a$ from the polygon formed by the edges of the slotted antenna unit cells 12. The rest of the rotational symmetric antenna array is as described above.

It is noted that the ground plane 102 shown in FIG. 8 may be utilized with the antenna unit cells 10 of FIG. 5 if desired.

Figure 9:
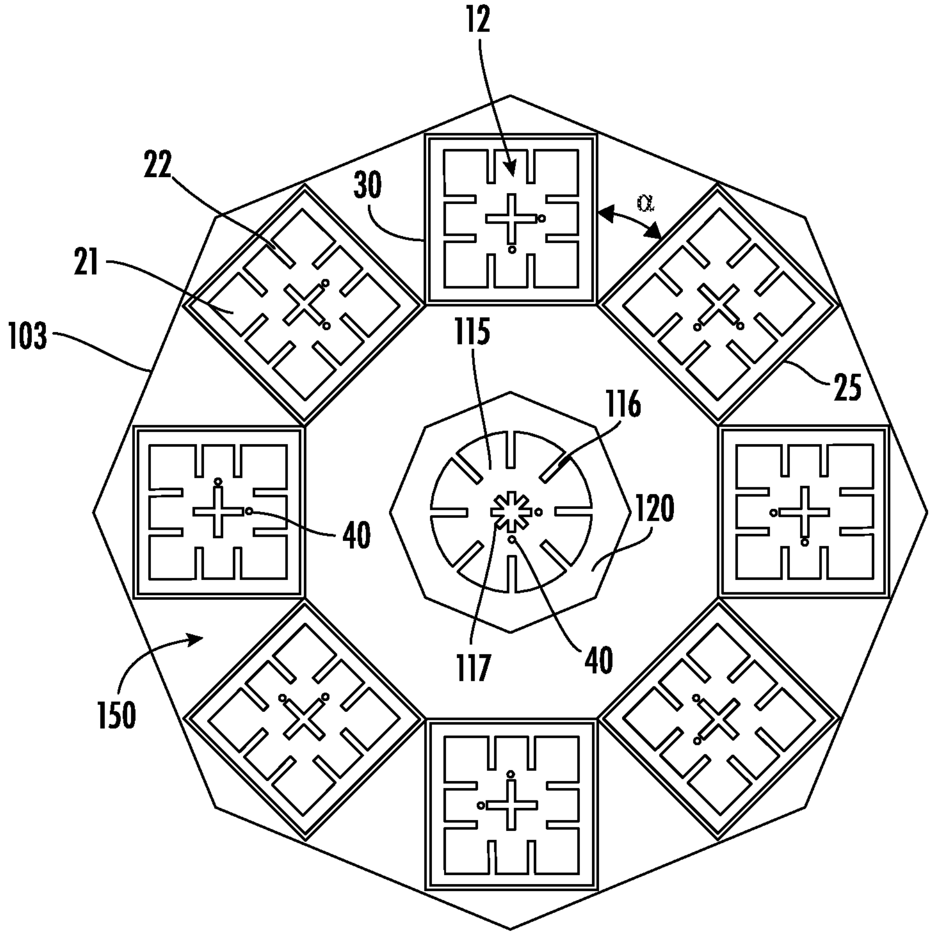
FIG. 9 shows a rotational symmetric antenna array having eight antenna unit cells according to a fifth embodiment.

FIG. 9 shows a variation of the rotational symmetric antenna array shown in FIG. 8. Like FIG. 8, the outer perimeter of the ground plane 103 is a polygon having the same number of sides as there are slotted antenna unit cells 12 in the outer ring 150. However, in this embodiment, the inner perimeter of the ground plane 103 is also a polygon having the same number of sides as there are slotted antenna unit cells 12 in the outer ring 150. Like the corners of the outer perimeter in FIG. 8, the corners of the inner polygon are located along a line that extends from the center of the rotational symmetric antenna array and passes through the midpoint of the side of a slotted antenna unit cell 12. In this way, the sides of the inner perimeter are parallel to the sides of the outer perimeter.

It is noted that the ground plane 103 shown in FIG. 9 may be utilized with the antenna unit cells 10 of FIG. 5 if desired.

Alternatively, the inner perimeter of the ground plane 103 may also be rotated such that the sides of the inner perimeter are parallel with the inside edges of the slotted antenna unit cells 12 in the outer ring 150. In other words, the inner perimeter of ground plane 103 may be rotated by 180°/$N_a$, wherein $N_a$ is the number of slotted antenna unit cells 12, from the polygon formed by the edges of the slotted antenna unit cells 12.

Additionally, the inner perimeter shown in FIG. 9 (or a rotated version thereof) may also be used with a circular outer perimeter, such as that shown in FIG. 6.

Figure 10A:
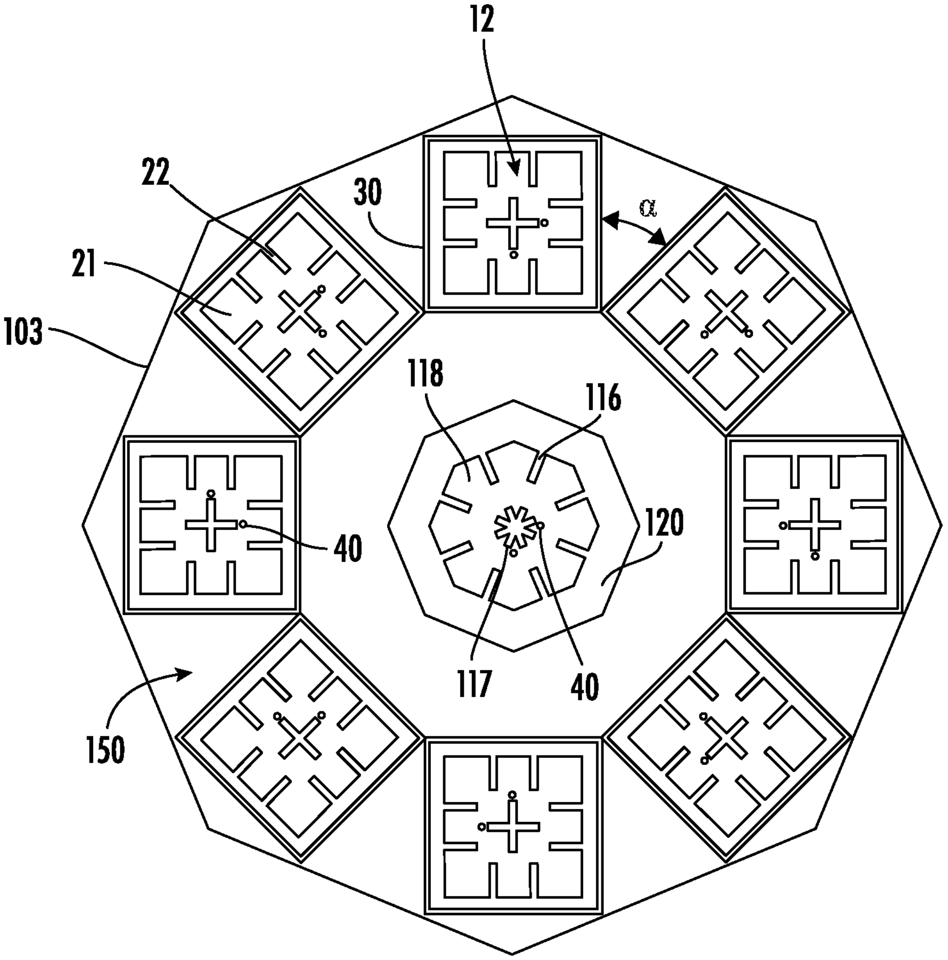
FIG. 10A shows a rotational symmetric antenna array having eight antenna unit cells according to a sixth embodiment.

FIG. 10A shows a variation of the rotational symmetric antenna array shown in FIG. 9. Like FIG. 9, the inner perimeter and outer perimeter of the ground plane 103 are polygons having the same number of sides as there are slotted antenna unit cells 12 in the outer ring 150. Additionally, in this embodiment, the central antenna 118 comprises a central patch antenna shaped as a polygon having the same number of sides as there are slotted antenna unit cells 12 in the outer ring. Thus, in this embodiment, the central patch antenna of the central antenna 118 is an octagon. In this embodiment, the sides of the central patch antenna are rotated with respect to the inner sides of the slotted antenna unit cells 12 by 180°/$N_a$, wherein $N_a$ is the number of slotted antenna unit cells 12. In this way, the corners of the central patch antenna are aligned with the midpoint of an inner side of a respective slotted antenna unit cell 12. Note that the inner perimeter of the ground plane 103 is oriented in the same manner as the central antenna 118, such that the sides of the inner perimeter of the ground plane 103 are parallel to the sides of the central patch antenna. As described above, the central patch antenna may be disposed on the top surface or on an intermediate layer. The central patch antenna may also have a slot 116 extending inward from each side of the perimeter of the central patch antenna. The slots 116 may be aligned so that they are located on the line extending from the center of the antenna array through the point where two slotted antenna unit cell 12 touch.

Figure 10B:
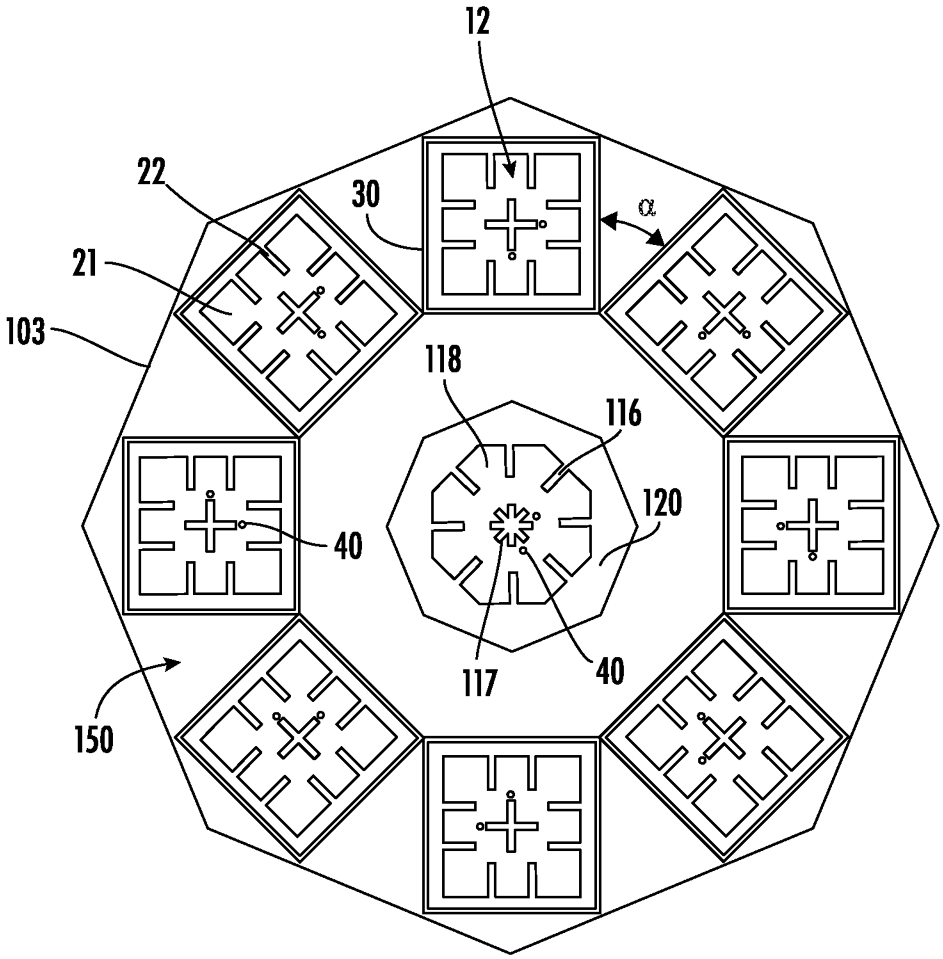
FIG. 10B shows a rotational symmetric antenna array having eight antenna unit cells according to a seventh embodiment.

FIG. 10B shows a variation of the rotational symmetric antenna array shown in FIG. 10A. In this embodiment, the central antenna 118 is rotated by 180°/$N_a$, wherein $N_a$ is the number of slotted antenna unit cells 12. In this way, the sides of the central patch antenna are parallel to the inner sides of the slotted antenna unit cells 12. In this embodiment, the slots 116 may be aligned so that they are located on the line extending from the center of the antenna array through the midpoint of a side of the slotted antenna unit cell 12. The star-shaped slots 117 are as described above. As described above, the central patch antenna may be disposed on the top surface or on an intermediate layer.

Note that the polygon shaped central antenna 118 shown in FIGS. 10A-10B may be combined with any of the previous embodiments, such as those shown in FIGS. 5-9.

Note that the shape of the patch antenna is selected such that the antenna array is symmetric. Assume that a wedge is defined as follows. $N_a$ lines are extended outward from the center of the antenna array extending to the outer perimeter of the ground plane wherein $N_a$ is the number of slotted antenna unit cells 12. These $N_a$ lines are equidistant, such that any two adjacent lines form an angle of 360/$N_a$° at the center. A wedge is defined as the area between two adjacent lines and outer perimeter of the ground plane. In each of these embodiments, all $N_a$ wedges are identical to one another. In other words, the portion of the patch antenna of the central antenna in each wedge is identical. Further, the spacing between the central antenna, the inner perimeter, the antenna unit cells and the outer perimeter is identical for each wedge. The only difference between the $N_a$ wedges is that only two of the wedges contain the signal vias for the central antenna. In all other respects, the wedges are identical.

Figure 11:
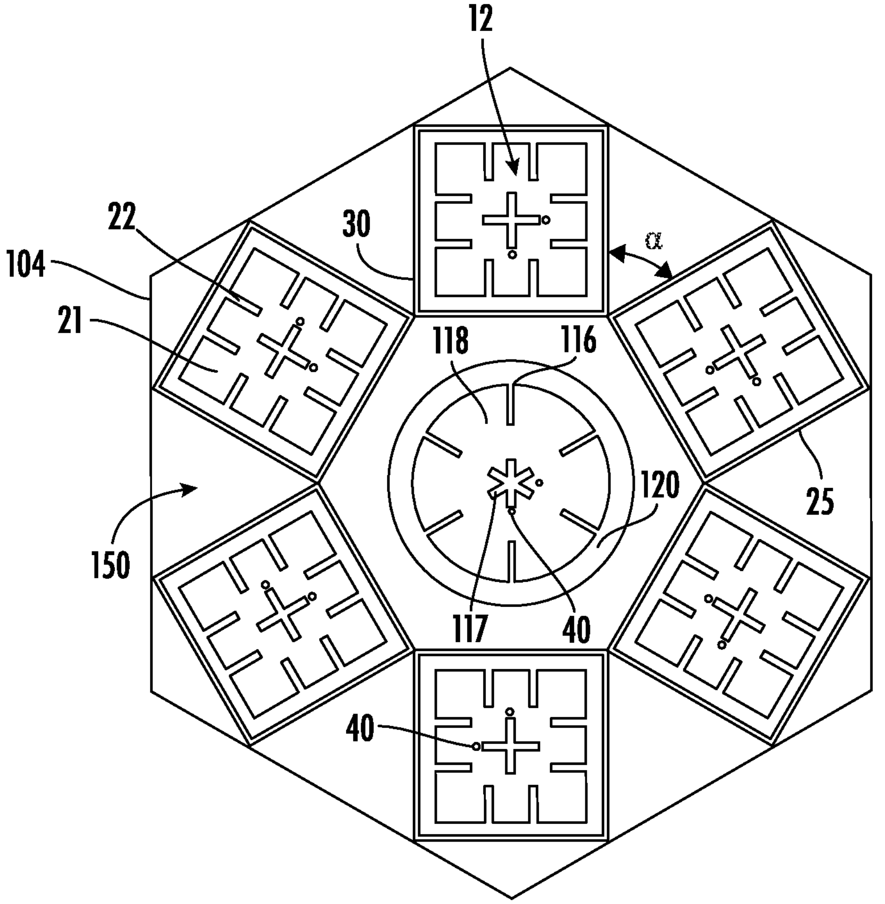
FIG. 11 shows a rotational symmetric antenna array having six antenna unit cells according to an embodiment.

Although the embodiments in FIGS. 5-10B show eight antenna unit cells in the outer ring, the outer ring may include any number of antenna unit cells that is greater than 3. For example, FIG. 11 shows a configuration that is similar to that in FIG. 8, but with six slotted antenna unit cells 12 in the outer ring 150. Because there are fewer slotted antenna unit cells 12, the angular offset, α, is greater than it was in the other embodiments. In this embodiment, α is 60°. Further, while the slotted central antenna 115 has a circular patch antenna, it is understood that the patch antenna may also have the shape of a hexagon if desired. Likewise, if there are $N_a$ antenna unit cells in the outer ring, the central antenna may be circular or a regular polygon having $N_a$ sides. Additionally, the patch antenna for the central antenna may be slotted, as shown in FIGS. 6-11, or may not have slots, as shown in FIG. 5. Further, the ground plane 104 may be circular or may be in the shape of a hexagon, as shown in FIG. 11.

In all of the embodiments shown in FIGS. 5-11, the ground plane is shown as being disposed on the top surface. However, in some embodiments, a similarly shaped ground plane is also disposed on the RIS layer 60. Further, if there are any intermediate metal layers, a similarly shaped ground plane may be disposed on those layers as well.

In operation, the central antenna is only used for determining the gain of the incoming signal. In certain embodiments, the two signal vias 40 associated with the central antenna are connected to a 90° hybrid so as to create a circularly polarized signal. This circularly polarized signal may then be used to determine the amplitude of the incoming signal. That determination can then be used to set the automatic gain control (AGC) for the radio circuit connected to the rotational symmetric antenna array.

This system and method have many advantages.

The use of a RIS layer 60 results in a smaller antenna array with improved performance.

First, with respect to size, a conventional antenna array, optimized for operation at 2.45 GHz, may utilize about 40% more real estate than the present rotational symmetric antenna array. For example, in one embodiment, a rotational symmetric antenna array comprising eight of the slotted antenna unit cells 12 shown in FIG. 1B, consume an area that is about 120 mm×120 mm. In another embodiment, a rotational symmetric antenna array comprising six of the slotted antenna unit cells 12 shown in FIG. 1B, consume an area that is about 100 mm×100 mm. This is significantly smaller than can be achieved using convention antenna unit cells that do not utilize slots and metamaterials.

Second, with respect to performance, as shown in FIGS. 12A-12D, the phase performance of all of the antenna unit cells is nearly identical. Since the antenna unit cells are arranged in a circular pattern, rather than referring to the two signals as vertical and horizontal, the terms "radial" and "tangential" are used.

Figure 12A:
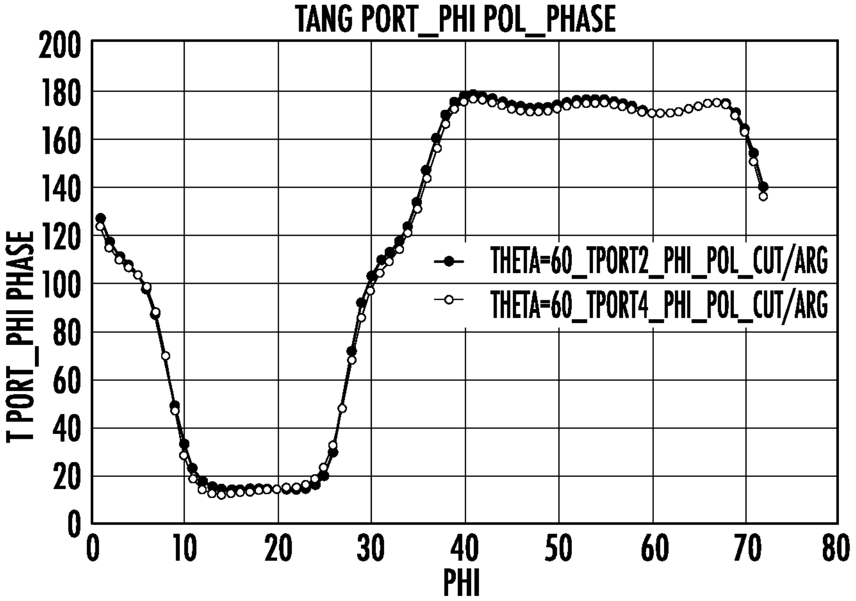
FIGS. 12A-12D show the phase radiation patterns for two different unit antenna cells in the outer ring of the rotational symmetric antenna array.
Figure 12B:
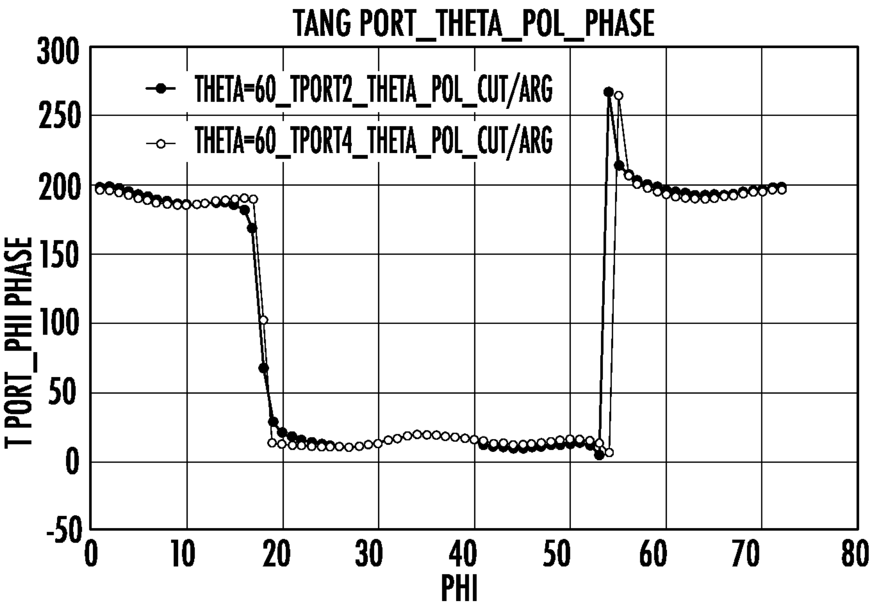
Figure 12C:
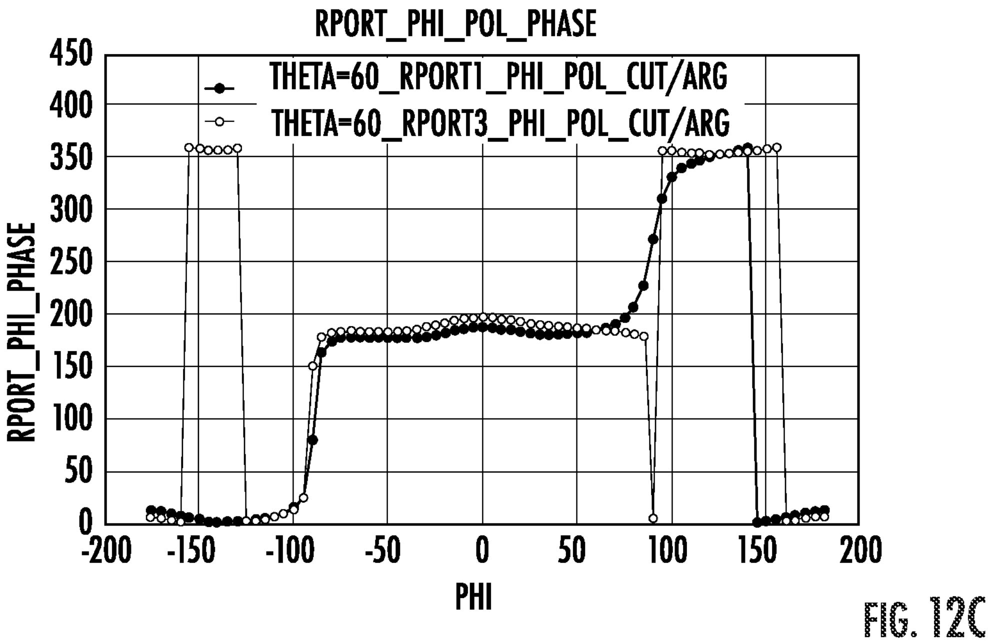
Figure 12D:
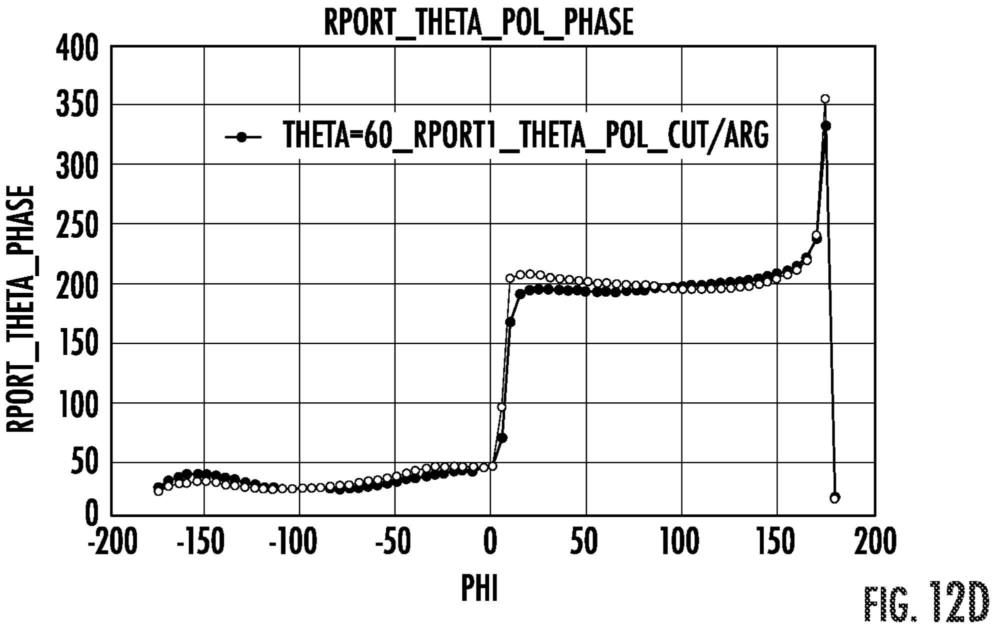

FIGS. 12A-12D show the phase performance for two different unit cells in one embodiment that utilizes 8 antenna unit cells in an array configured to operate at 2.45 GHz, as shown in FIG. 8. These figures show a 60° θ cut of the phase radiation characteristics with sweeping the azimuth (φ) angle. FIG. 12A shows the tangential port φ signal; FIG. 12B shows the tangential port θ signal; FIG. 12C shows the radial port φ signal; and FIG. 12D shows the radial port θ signal. Note that the phase performance for the different antenna unit cells is nearly identical for all ports and polarizations. Note that the jump in phase that appears in the figures is due to the limited range of the graphs from 0-360°. Therefore, instead of showing a phase of −1°, that phase appears as 359° in the graphs.

Third, as described above, in certain embodiments, the antenna array is used in conjunction with an AoX algorithm. In each of these algorithms, the algorithm utilizes phase information from each of the plurality of antennas in the antenna array. Traditionally, compensation values are associated with both ports and both polarizations for each antenna unit cell in the array. Thus, as described above, a 4×4 two dimensional array may have 64 unique compensation values that must be calculated and stored. Since the phase performance of the antenna unit cells in the outer ring of the rotational symmetric antenna array is nearly identical, the system only needs to save 4 values, associated with each port and each polarization. Thus, there is significantly less processing power required to perform the calibration process and much less memory is required to store the compensation values.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An antenna array, comprising:
- a plurality ($N_a$) of antenna unit cells arranged in an outer ring, each antenna unit cell offset from an adjacent antenna unit cell by an angle equal to 360°/$N_a$, wherein each antenna unit cell comprises:
  - a top surface, comprising a patch antenna and a ground guard ring surrounding the patch antenna;
    - a reactive impedance surface (RIS) layer disposed beneath the top surface, wherein the RIS layer comprises metamaterial structures; and
  - a ground layer disposed beneath the RIS layer, wherein stitching vias electrically connect the ground guard ring to the ground layer; and
  - a central antenna disposed inside the outer ring.

2. The antenna array of claim 1, wherein the RIS layer is immediately adjacent to the top surface.

3. The antenna array of claim 2, wherein the ground layer is immediately adjacent to the RIS layer.

4. The antenna array of claim 1, wherein the metamaterial structures comprise hollow square frames.

5. The antenna array of claim 1, wherein an integral number of metamaterial structures are disposed on the RIS layer in an area defined by the ground guard ring.

6. The antenna array of claim 5, wherein the integral number is $N^2$, wherein N is an integer.

7. The antenna array of claim 1, further comprising one or more unused metal layers disposed between the top surface and the RIS layer and/or between the RIS layer and the ground layer.

8. An antenna array, comprising:
- a plurality ($N_a$) of antenna unit cells arranged in an outer ring, each antenna unit cell offset from an adjacent antenna unit cell by an angle equal to 360°/$N_a$, wherein each antenna unit cell comprises:
  - a top surface, comprising a patch antenna and a ground guard ring surrounding the patch antenna;
    - a reactive impedance surface (RIS) layer disposed beneath the top surface, wherein the RIS layer comprises metamaterial structures; and
  - a ground layer disposed beneath the RIS layer, wherein stitching vias electrically connect the ground guard ring to the ground layer;
  - a central antenna disposed inside the outer ring; and
  - a ground plane disposed on the top surface, disposed on the top surface between the central antenna and the outer ring and outside the outer ring.

9. The antenna array of claim 8, wherein an outer perimeter of the ground plane is circular.

10. The antenna array of claim 8, wherein an outer perimeter of the ground plane is a polygon having $N_a$ sides.

11. The antenna array of claim 10, wherein sides of the outer perimeter of the ground plane are parallel to edges of the antenna unit cells disposed in the outer ring.

12. The antenna array of claim 10, wherein sides of the outer perimeter of the ground plane are offset from edges of the antenna unit cells disposed in the outer ring by $180°/N_a$.

13. The antenna array of claim 8, wherein an inner perimeter of the ground plane is circular.

14. The antenna array of claim 8, wherein an inner perimeter of the ground plane is a polygon having $N_a$ sides.

15. The antenna array of claim 14, wherein sides of the inner perimeter of the ground plane are parallel to edges of the antenna unit cells disposed in the outer ring.

16. The antenna array of claim 14, wherein sides of the inner perimeter of the ground plane are offset from edges of the antenna unit cells disposed in the outer ring by $180°/N_a$.

17. The antenna array of claim 8, wherein the ground guard ring of each antenna unit cell contacts the ground guard ring of two adjacent antenna unit cells.

18. The antenna array of claim 8, wherein each patch antenna comprises star-shaped slots in a center of the patch antenna and one or more slots extending inward from a perimeter of the patch antenna.

19. The antenna array of claim 8, wherein the central antenna comprises a central patch antenna, and the central patch antenna is circular.

20. The antenna array of claim 8, wherein the central antenna comprises a central patch antenna, and the central patch antenna is a polygon having N a sides.

21. The antenna array of claim 8, wherein the central antenna comprises a central patch antenna having star-shaped slots in a center of the central patch antenna and one or more slots extending inward from a perimeter of the central patch antenna.

22. The antenna array of claim 8, wherein each patch antenna of the plurality of antenna unit cells has one signal via and has one polarization.

23. The antenna array of claim 8, wherein each patch antenna of the plurality of antenna unit cells has one signal via located at a diagonal of the patch antenna and has circular polarization.

24. The antenna array of claim 8, wherein each patch antenna of the plurality of antenna unit cells has two signal vias and has two polarizations or has circular polarization.

25. The antenna array of claim 8, wherein the central antenna comprises a central patch antenna, and the central patch antenna has two signal vias and has circular polarization.

* * * * *